US012650666B2

(12) United States Patent
Oh

(10) Patent No.: US 12,650,666 B2
(45) Date of Patent: Jun. 9, 2026

(54) METHOD AND APPARATUS FOR PROCESSING PHASE INFORMATION

(71) Applicant: ELECTRONICS AND TELECOMMUNICATIONS RESEARCH INSTITUTE, Daejeon (KR)

(72) Inventor: Kwan-Jung Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1180 days.

(21) Appl. No.: 17/578,314

(22) Filed: Jan. 18, 2022

(65) Prior Publication Data

US 2022/0229397 A1 Jul. 21, 2022

(30) Foreign Application Priority Data

Jan. 19, 2021 (KR) ........................ 10-2021-0007426

(51) Int. Cl.
*G03H 1/04* (2006.01)
*G01B 9/021* (2006.01)
*G03H 1/08* (2006.01)

(52) U.S. Cl.
CPC ........... *G03H 1/0443* (2013.01); *G01B 9/021* (2013.01); *G03H 1/0841* (2013.01); *G03H 2001/0458* (2013.01)

(58) Field of Classification Search
CPC .............. G03H 1/0443; G03H 1/0841; G03H 2001/0458; G03H 2001/085; G01B 9/021
See application file for complete search history.

(56) References Cited

U.S. PATENT DOCUMENTS

| | | | |
|---|---|---|---|
| 9,097,782 B2 | 8/2015 | Haacke et al. | |
| 10,462,489 B2 | 10/2019 | Min et al. | |
| 2010/0271675 A1 | 10/2010 | Leister et al. | |
| 2013/0083893 A1* | 4/2013 | Ishii ................. | G01N 23/20075 |
| | | | 382/173 |
| 2018/0307181 A1 | 10/2018 | Lee et al. | |
| 2018/0356355 A1* | 12/2018 | Momose .............. | A61B 6/4035 |
| 2021/0209337 A1* | 7/2021 | Ozcan ..................... | G06T 7/254 |
| 2023/0162861 A1* | 5/2023 | Campeau ............. | A61B 5/7264 |
| | | | 600/545 |
| 2023/0326057 A1* | 10/2023 | Blanche ................... | G06T 5/70 |
| | | | 382/108 |

FOREIGN PATENT DOCUMENTS

| | | |
|---|---|---|
| JP | 2011038984 A | 2/2011 |
| JP | 2018-206453 A | 12/2018 |
| KR | 20080094038 A | 10/2008 |
| KR | 10-2016-0081527 A | 7/2016 |

* cited by examiner

*Primary Examiner* — Benjamin O Dulaney

(57) ABSTRACT

Disclosed are a method and an apparatus for processing phase information. When receiving a phase image including phase information, a processing device performs phase remapping of mapping the phase image to a predetermined range. The predetermined range is a range of a first phase value to a second phase value having a period of $2\pi$, and a difference between the first phase value and the second phase value is $2\pi$.

11 Claims, 14 Drawing Sheets

FIG. 1

Amplitude    Phase

FIG. 5
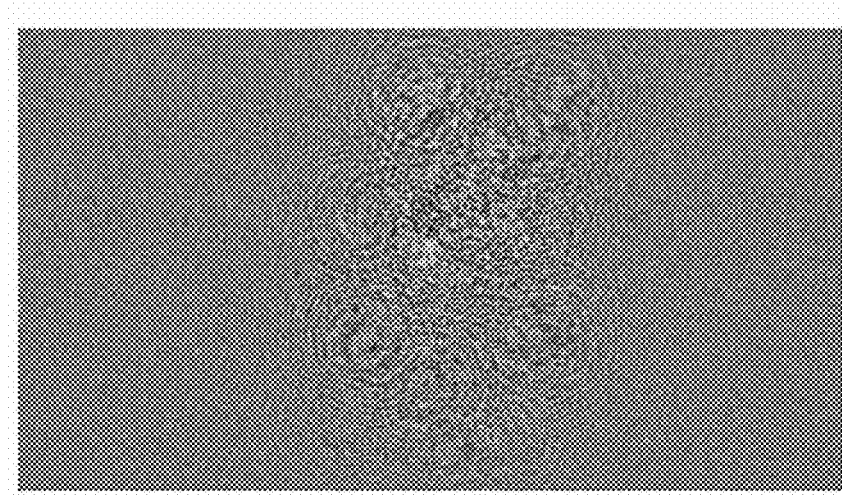
(a) Normal phase image
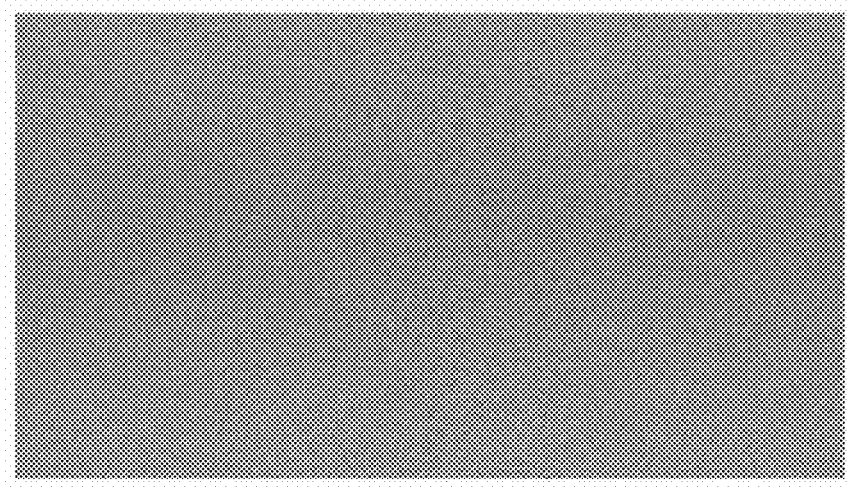
(b) Differential phase image Input a phase image for each frame of a moving image — S500

Perform prediction on a current frame — S510

Obtain a residual signal based on the current frame and a predicted frame — S520

Perform phase remapping on the residual signal — S530

Transform the phase remapped residual signal — S540

Entropy encoding — S550

FIG. 10

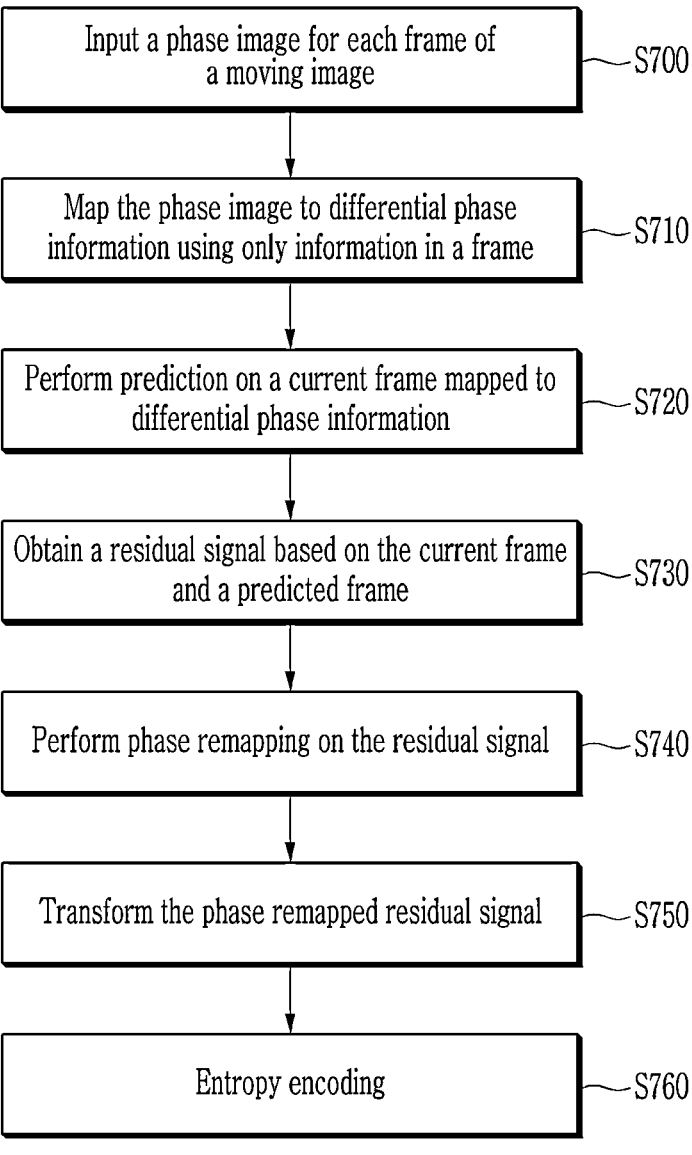

Input a phase image for each frame of a moving image —S700

Map the phase image to differential phase information using only information in a frame —S710

Perform prediction on a current frame mapped to differential phase information —S720

Obtain a residual signal based on the current frame and a predicted frame —S730

Perform phase remapping on the residual signal —S740

Transform the phase remapped residual signal —S750

Entropy encoding —S760

Input a phase image — S900

Perform phase remapping on an original signal which is the phase image or a reference signal — S910

Obtain differential phase information based on using the selectively phase-remapped original signal or reference signal — S920

Input a phase image for each frame of a moving image — S1100

Perform phase remapping on the phase image — S1110

Perform phase remapping on the phase-remapped current frame — S1120

Obtain a residual signal based on phase-remapped current frame and a prediction frame — S1130

Transform the residual signal — S1140

Entropy encoding — S1150

METHOD AND APPARATUS FOR PROCESSING PHASE INFORMATION

CROSS-REFERENCE TO RELATED APPLICATION

This application claims priority to and the benefit of Korean Patent Application No. 10-2021-0007426 filed in the Korean Intellectual Property Office on Jan. 19, 2021, the entire contents of which are incorporated herein by reference.

BACKGROUND OF THE INVENTION

(a) Field of the Invention

The present disclosure relates to phase information, and more particularly, to a method and apparatus for processing phase information.

(b) Description of the Related Art

Phase information is generally used for the purpose of measurement using a specific sine wave or for the purpose of three-dimensional imaging by expressing both the intensity and phase of light, like holography. In the field of holography, complex holographic data in an amplitude & phase scheme or phase information in a phase hologram is generally expressed in the form of a two-dimensional image.

A phase is a value indicating the position or time difference from the start point in one period or a period of a periodic signal such as vibration or wavelength, and one period is generally expressed as 360 degrees or $2\pi$ radians. In general, phase information is used to measure a distance or a surface of an object using a specific sine wave, or is used to perform three-dimensional imaging by expressing both the intensity and phase of light, like holography.

A method capable of more effectively representing such phase information is required.

SUMMARY OF THE INVENTION

The present invention has been made in an effort to provide a method and apparatus for expressing a phase as information with improved spatiotemporal correlation by using the periodic characteristic of the phase.

According to an embodiment of the present disclosure, a method for processing phase information is provided. The method includes: receiving, by a processing device, a phase image including phase information; and performing, by the processing device, phase remapping of mapping the phase image to a predetermined range, wherein the predetermined range is a range of a first phase value to a second phase value having a period of $2\pi$, and a difference between the first phase value and the second phase value is $2\pi$.

In an implementation, the performing of phase remapping may include obtaining, by the processing device, differential phase information based on the phase image and a reference signal so that the phase image is expressed as differential information, wherein the differential phase information may be included in the predetermined range.

In an implementation, the method may further include, after the obtaining of differential phase information, performing phase remapping of mapping the differential phase information to the predetermined range.

In an implementation, the obtaining of differential phase information may include performing phase remapping of mapping of an original signal which is the phase image or the reference signal to the predetermined range.

In an implementation, the performing of phase remapping of mapping the differential phase information to the predetermined range may include: adding a value of $2\pi$ to a smaller value than the first phase value among values of the phase information; and subtracting a value of $2\pi$ from a greater value than the second phase value among values of the phase information, wherein the phase information may correspond to one of the phase image, the reference signal, and the differential phase information.

In an implementation, the obtaining of differential phase information may include performing phase remapping for adjusting a phase range of an original signal which is the phase image or the reference signal so that the differential phase information is included in the predetermined range. Here, when a signal to which phase remapping is not performed among the original signal or the reference signal is referred to as a first signal and a signal to which phase remapping is performed among the original signal or the reference signal is referred to as a second signal, the phase remapping for adjusting the phase range of the original signal or the reference signal may be performed so that a value obtained by subtracting a maximum phase value of the second signal from a minimum phase value of the first signal and a value obtained by subtracting a minimum phase value of the second signal from a maximum phase value of the first signal are included in a range of $2\pi$.

In an implementation, the obtaining of differential phase information may include obtaining the differential phase information by setting a most distributed value among the phase information of the phase image as a reference value, which is a reference signal, and performing a process of subtracting the reference value from a value of phase information of each pixel constituting the phase image.

In an implementation, the obtaining of differential phase information may include dividing the phase image into a plurality of blocks, calculating a difference between a value of phase information of one block and a value of phase information of another block to obtain the differential phase information. Here, the one block may be a previously encoded and then decoded block, the other block may be a block to be encoded, and the reference signal may be decoded data of the decoded block.

In an implementation, for a block other than a first block among the plurality of blocks, the difference in the phase information may be calculated to obtain the differential phase information. Here, for the first block, a process of setting a most distributed value among phase information of the first block as a reference value, which is a reference signal, and subtracting the reference value from a value of phase information of each pixel constituting the first block to obtain the differential phase information for the first block, may be performed or separate processing for the first block may not be performed.

In an implementation, when the phase image is a phase image of a moving image, the phase image is input frame by frame, and the obtaining of differential phase information may include: obtaining a prediction frame which is the reference signal by performing prediction on a phase image of a current frame; and obtaining a residual signal between an original signal that is a phase image of the current frame and a reference signal that is the prediction frame and using the residual signal as the differential phase information.

In an implementation, the method may further include, after the obtaining of differential phase information, performing phase remapping of mapping the differential phase information to the predetermined range. Here, the performing phase remapping of mapping the differential phase may include: adding a value of $2\pi$ to a smaller value than the first phase value among values of the differential phase information; and subtracting a value of $2\pi$ from a greater value than the second phase value among values of the differential phase information.

In an implementation, the obtaining of a prediction frame that is the reference signal may include: performing phase remapping of adjusting phase information to a first mapping range on a phase image of a current frame; and obtaining the prediction frame as the reference signal by performing prediction on the phase image of the current frame adjusted to the first mapping range. Here, the using of the residual signal as the differential phase information may include: performing phase remapping of adjusting phase information to a second mapping range on the prediction frame, which is the reference signal; and obtaining a residual signal between the current frame adjusted to the first mapping range and the prediction frame adjusted to the second mapping range, and using the residual signal as the differential phase information.

In an implementation, when the phase image is a phase image of a moving image, and the phase image is input frame by frame, the obtaining of differential phase information may include: obtaining first differential phase information based on phase information of a phase image of a current frame; obtaining a prediction frame which is the reference signal by performing prediction based on the first differential phase information obtained with respect to the current frame; and obtaining a residual signal between the current frame corresponding to the first differential phase information and the prediction frame and using the residual signal as second differential phase information. Here, the performing of phase remapping of mapping the differential phase information may include mapping the second differential phase information to the predetermined range.

According to another embodiment of the present disclosure, an apparatus for processing phase information is provided. The apparatus includes an interface device, and a processor configured to perform processing of phase information input through the interface device, wherein the processor is configured to perform operations by: receiving a phase image including phase information through the interface device; and obtaining differential phase information based on the phase image and a reference signal so that the phase image is expressed as differential information, wherein the differential phase information is included in a predetermined range, the predetermined range is a range of a first phase value to a second phase value having a period of $2\pi$, and a difference between the first phase value and the second phase value is $2\pi$.

In an implementation, the processor may be configured to perform operations by: performing phase remapping of mapping the differential phase information to the predetermined range after the obtaining of differential phase information; or performing phase remapping of mapping an original signal which is the phase image or the reference signal to the predetermined range when obtaining differential phase information.

In an implementation, the processor may be configured to perform operations by, when performing phase remapping: adding a value of $2\pi$ to a smaller value than the first phase value among values of the phase information; and subtracting a value of $2\pi$ from a greater value than the second phase value among values of the phase information, wherein the phase information may correspond to one of the phase image, the reference signal, and the differential phase information.

In an implementation, when the phase image is a phase image of a moving image, the phase image is input frame by frame, and the processor may be configured to perform operations by, when obtaining the differential phase information: obtaining a prediction frame which is the reference signal by performing prediction on a phase image of a current frame; and obtaining a residual signal between an original signal that is a phase image of the current frame and a reference signal that is the prediction frame and using the residual signal as the differential phase information.

In an implementation, the processor may be configured to further perform an operation by, after obtaining the differential phase information, performing phase remapping of mapping the differential phase information to the predetermined range. Here, the processor may be configured to perform operations by, when performing phase remapping of mapping the differential phase information, adding a value of $2\pi$ to a smaller value than the first phase value among values of the differential phase information, and subtracting a value of $2\pi$ from a greater value than the second phase value among values of the differential phase information.

In an implementation, the processor may be configured to perform operations by, when obtaining of a prediction frame that is the reference signal, performing phase remapping of adjusting phase information to a first mapping range on a phase image of a current frame, and obtaining the prediction frame as the reference signal by performing prediction on the phase image of the current frame adjusted to the first mapping range. Here, the processor may be configured to perform operations by, when using of the residual signal as the differential phase information: performing phase remapping of adjusting phase information to a second mapping range on the prediction frame, which is the reference signal; and obtaining a residual signal between the current frame adjusted to the first mapping range and the prediction frame adjusted to the second mapping range, and using the residual signal as the differential phase information.

In an implementation, when the phase image is a phase image of a moving image, the phase image is input frame by frame, the processor may be configured to perform operations by, when obtaining differential phase information: obtaining first differential phase information based on phase information of a phase image of a current frame; obtaining a prediction frame which is the reference signal by performing prediction based on the first differential phase information obtained with respect to the current frame; and obtaining a residual signal between the current frame corresponding to the first differential phase information and the prediction frame and using the residual signal as second differential phase information. Here, the processor may be configured to further perform an operation by, after obtaining of differential phase information, mapping the second differential phase information to the predetermined range.

BRIEF DESCRIPTION OF THE DRAWINGS

FIG. 1 is an exemplary diagram illustrating complex hologram data.

FIG. 5 is an exemplary diagram illustrating a phase image expressed by a differential manner according to an embodiment of the present disclosure.

FIG. 10 is a flowchart of a phase information processing method according to a third example of the first embodiment of the present disclosure.

DETAILED DESCRIPTION OF THE EMBODIMENTS

Figure 2:
FIG. 2 is a diagram illustrating characteristics of a phase information processing method according to an embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements.

The expressions described in the singular may be interpreted as singular or plural unless an explicit expression such as "one", "single", and the like is used.

In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, a first component may be referred to as a second component, and similarly, the second component may be referred to as the first component.

Hereinafter, a method and apparatus for processing phase information according to an embodiment of the present disclosure will be described with reference to the drawings.

Various digital data are generally expressed in the form of a two-dimensional image to facilitate signal processing and compression, and phase information is also expressed in the form of a two-dimensional image. The phase information is a value indicating a position or a time difference with respect to a start time within one period or a period of a periodic signal. This phase information is used for measurement using a specific sine wave or for 3D imaging by expressing both the intensity and phase of light, like holography.

Figure 1:
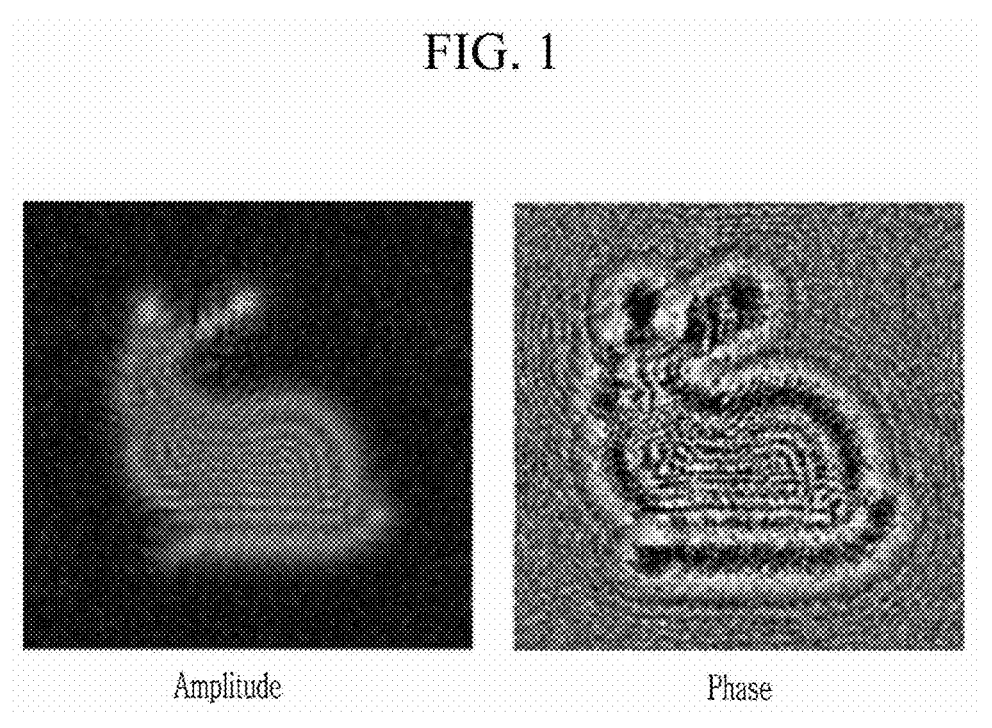

FIG. 1 is an exemplary diagram illustrating complex hologram data.

In the field of holography, complex hologram data is expressed in an amplitude & phase scheme. For example, as in FIG. 1, the complex hologram data may be expressed in an amplitude & phase scheme. When the complex hologram data is expressed in the phase method, for example, a complex value may be expressed as amplitude and phase, and only phase information may be extracted from among them and expressed in the form of an image. In this case, for the optimization of the phase hologram, methods such as Iterative Fourier Transform Algorithm (IFTA), Direct Binary Search (DBS), and Error Diffusion (ED) may be applied.

As such, the phase information may be expressed in the form of a two-dimensional image to facilitate signal processing and compression, as shown in FIG. 1. The phase information expressed in the form of an image is referred to as a phase image.

In an embodiment of the present disclosure, phase remapping is performed on phase information of a phase image in consideration of a periodic characteristic of a phase.

FIG. 2 is a diagram illustrating characteristics of a phase information processing method according to an embodiment of the present disclosure.

The phase image may express the value in consideration of the periodic characteristic of the phase. For example, when 0 to $2\pi$ are expressed as 0 to 255, which is the value of an 8-bit image, 0 may be the same as 255 due to the periodicity of the phase. If the $2\pi$ value is quantized based on 256 instead of 255 for optimal quantization of the phase section, the phase value of 0 may be equal to 256.

In an embodiment of the present disclosure, processing efficiency such as compression efficiency is improved by improving spatiotemporal correlation in image processing including image compression by using the periodicity of the phase. To this end, as shown in the FIG. 1, phase remapping is performed on the phase information value (phase value) of the phase image to obtain a remapped phase value. Here, the phase remapping is to adjust the phase value, and includes decreasing or increasing the range of the phase value. This phase remapping includes, for example, mapping a phase value to a predetermined range, wherein the predetermined range is a range of a first phase value to a second phase value, and the difference between the first phase value and the second phase value may be $2\pi$. The process of mapping to the predetermined range may include a process of adding or subtracting $2\pi$ to or from the phase value.

In addition, in an embodiment of the present disclosure, the phase image is expressed as differential phase information, and the phase information is processed so that the differential phase information is included in a predetermined range having a period of $2\pi$.

A two-dimensional image has a high temporal-spatial correlation because pixel values between adjacent pixels or between successive frames are similar. Therefore, a spatial difference image using a difference value with an adjacent pixel or a difference image with a prediction image between successive frames has a value of 0 in most cases.

Figure 3:
FIG. 3 is an exemplary diagram illustrating a difference image of a two-dimensional image.

FIG. 3 is an exemplary diagram illustrating a difference image of a two-dimensional image.

When the difference values of successive pixels are obtained, as illustrated in FIG. 3, most of them have a value of 0. That is, for data having high spatial correlation, when the difference between adjacent samples is obtained, spatial data redundancy is improved, and most of the values are 0. In the case of a two-dimensional moving image, data redundancy is high in the case of a difference image obtained through temporal prediction between successive frames. Accordingly, it is easy to compress.

However, the differential information is not used well when expressing images. The biggest reason is that in the case of differential information, the range of data values to be expressed is increased compared to the original data. In other words, in the case of an image having pixels having a value of 0 to 255, if the image is expressed as a difference between adjacent pixels, the range of the value is −255 to 255. Therefore, if the data is to be expresses in the same domain, 1 bit more per sample is required. So, from the point of view of raw data, the total amount of data is rather increased. That is, although data redundancy can be improved, the number of bits per sample is increased.

On the other hand, in the phase information, data expression using a difference image may be developed differently from a conventional two-dimensional image.

In an embodiment of the present disclosure, when the phase information is expressed as an image, an image is expressed as differential phase information using a periodic characteristic of the phase information.

The phase information has, for example, a range of $-\pi$ to $\pi$. If such phase information is expressed through a difference, the range of the value increases from $-2\pi$ to $2\pi$. However, due to the periodic nature of the phases, the phases of $-2\pi$ to $2\pi$ can be expressed in the range of $-\pi$ to $\pi$. That is, even if the phase information is differentiated, the range of its value does not increase, so that the number of bits per sample does not increase.

Therefore, in the embodiment of the present disclosure, the phase information is expressed as differential phase information by using the periodic characteristics of the phase information, and the differential phase information is processed so as to be within a phase period range of $2\pi$.

Figure 4:
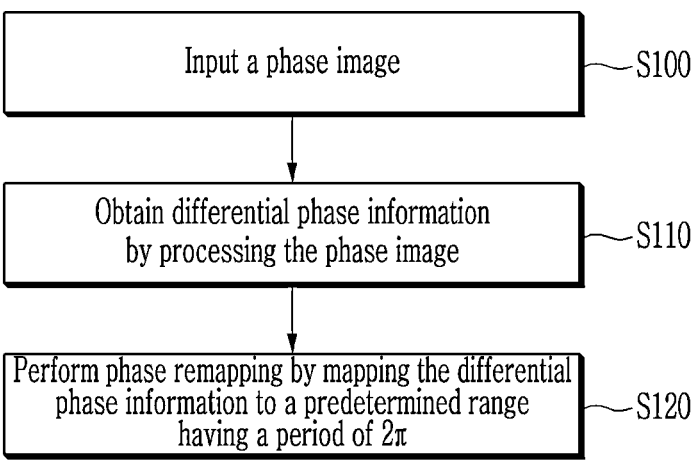
FIG. 4 is a flowchart of a phase information processing method according to a first embodiment of the present disclosure.

FIG. 4 is a flowchart of a phase information processing method according to a first embodiment of the present disclosure.

The phase information is expressed as an image, and this phase image is input (S100).

When a phase image is input, the input phase image is expressed in a differential method. That is, the differential phase information of the phase image is obtained (S110). A process of acquiring differential phase information will be described later in more detail.

Phase remapping is performed on the obtained differential phase information (S120). Specifically, the differential phase information is mapped to a predetermined range based on the periodicity characteristic of the phase. Here, the predetermined range has a range of a first phase value to a second phase value having a periodic characteristic of $2\pi$, and a difference between the first phase value and the second phase value is $2\pi$. For example, a process of adding a $2\pi$ value to phase values smaller than the first phase value in the differential phase information and subtracting a $2\pi$ value from phase values larger than the second phase value in the differential phase information is performed, thereby differential phase information is mapped to the predetermined range. Hereinafter, the predetermined range will be described as an example of $-\pi$ to $\pi$, but the embodiment of the present disclosure is not limited thereto. The predetermined range may be 0 to $2\pi$, or may be expressed in a wide range such as $2\pi$, $3\pi$, or $4\pi$, or any range capable of expressing a phase having a period of $2\pi$ may be used as the predetermined range.

Through the process described above, the phase information of the phase image is expressed as differential phase information and the range of differential phase information is remapped into a range having a period of $2\pi$. In this case, the number of bits per unit does not increase because the range of the value does not increase even if the difference is made. A differential phase image may be obtained based on the differential phase information.

FIG. 5 is an exemplary diagram illustrating a phase image expressed by a differential manner according to an embodiment of the present disclosure.

For example, when a normal phase image in the form of a two-dimensional image as shown in (a) of FIG. 5 is expressed in a differential manner as described above in the embodiment of the present disclosure, the differential phase image as shown in (b) of FIG. 5 can be obtained. As can be seen from (b) of FIG. 5, the differential phase image has better spatial correlation than the normal phase image, and it has been confirmed that the differential phase image shows better performance during actual compression.

Next, methods including specific processes of obtaining differential phase information based on the phase processing method of the first embodiment described above will be described.

Figure 6:
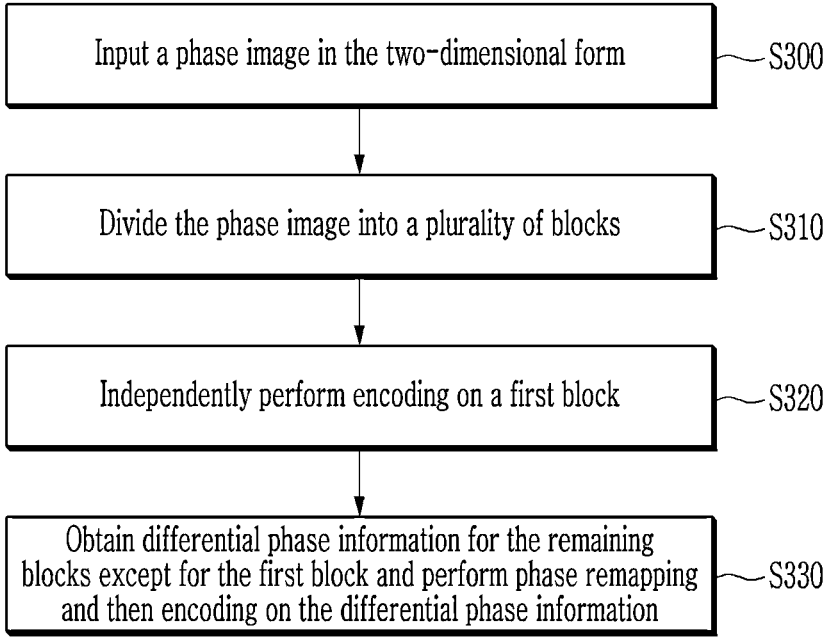
FIG. 6 is a flowchart of a phase processing method according to a first example of the first embodiment of the present disclosure.

FIG. 6 is a flowchart of a phase processing method according to a first example of the first embodiment of the present disclosure.

In the first example of the first embodiment of the present disclosure, a phase image of a still image is expressed in a differential manner. To this end, the phase information of the still image is expressed in the form of a two-dimensional image, and the two-dimensional image of the phase information is referred to as a phase image.

First, as in FIG. 6, when a two-dimensional phase image is input (S300), the phase image is divided into a plurality of blocks (S310). The size of each block may be expressed as N×M, and in some cases, if M or N is 1, the corresponding block may be a line.

Thereafter, differential phase information is obtained for the phase image divided into a plurality of blocks, encoding is performed based on the obtained differential phase information, and encoding is performed on a block basis.

Here, the first block among the plurality of blocks is independently encoded using only the information of the corresponding block (S320). In other words, independent encoding using only the phase values of pixels included in the corresponding block is performed on the first block without obtaining differential phase information.

Differential phase information is respectively obtained for the remaining blocks except for the first block among the plurality of blocks, and the obtained differential phase information is encoded (S330). Here, a current block and a previously encoded block are expressed as differential information and the differential information is encoded. That is, for the current block, differential phase information that is the difference between the decoded phase value of each pixel of the previous block and the phase value of each pixel of the block to be currently encoded is obtained, phase remapping of mapping to a predetermined range, which is based on periodicity characteristic of phase is performed on the obtained differential phase information, and the differential phase information on which phase remapping is performed is encoded. In this case, in order to match the information between the encoder and the decoder, a previously encoded and then decoded block is used as a previous block used in calculating a differential image.

Figure 7:
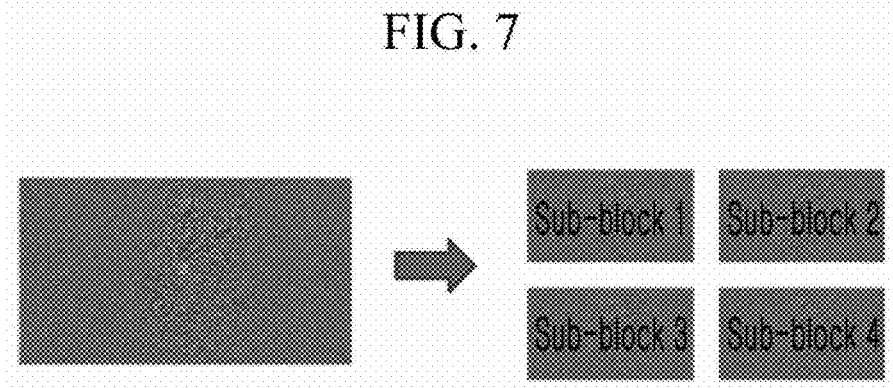
FIG. 7 is an exemplary diagram illustrating a case in which a phase image is divided into four blocks and encoded according to an embodiment of the present disclosure.

FIG. 7 is an exemplary diagram illustrating a case in which a phase image is divided into four blocks and encoded according to an embodiment of the present disclosure.

The phase image is divided into 4 blocks, as in FIG. 7.

During encoding, the first block among the four blocks is independently encoded without considering a difference from other blocks. That is, in FIG. 7, the sub-block 1 is subjected to independent encoding, and the remaining sub-blocks 2 to 4 are encoded by generating differential data (differential phase information) using the decoded data of the previously encoded blocks and encoding the differential data. For example, for the sub-block 2, differential data that represent a difference between the decoded data (phase values of the pixels of the sub-block 1 that have been encoded and then decoded) of the already-encoded block (e.g., the sub-block 1) and the data (phase values of pixels of the sub-block 2) of the block to be encoded next (e.g., the sub-block 2) are calculated, and the differential data are encoded. In this case, the differential data is mapped to a range of $-\pi$ to $\pi$ and then encoded.

Meanwhile, bit-depths representing the phase values of blocks may be different. For example, the sub-block 1 may be expressed by 10 bits and the sub-block 2 may be expressed by 8 bits, and vice versa. In addition, the method of dividing the block is not limited. For example, if a phase image is divided into quarters, it may be spatially divided into quarters. Or, if a phase image is divided into quarters, the phase image is expressed as a 2×2 block as a whole, pixels corresponding to the (1, 1) positions are collected and defined as a sub-block 1, pixels corresponding to the (1, 2) position are collected and defined as a sub-block 2, pixels corresponding to the (2, 1) position are collected and defined as a sub-block 3, and pixels corresponding to the (2, 2) position are collected and defined as a sub-block 4.

Meanwhile, in the first example of the first embodiment of the present disclosure, differential phase information was obtained by considering the difference only for the remaining blocks except for the first block, but the present disclosure is not limited thereto, and the difference is considered for all blocks as described above to obtain differential phase information and perform phase remapping and encoding. Therefore, the phase information of the phase image of the still image is expressed as differential phase information, and the range of differential phase information is remapped to a range having a period of $2\pi$ and then encoded. In this case, the number of bits per unit does not increase because the range of the value does not increase even if the difference is made.

Meanwhile, in the first example of the above first embodiment, the differential phase information may be obtained using another method.

Figure 8:
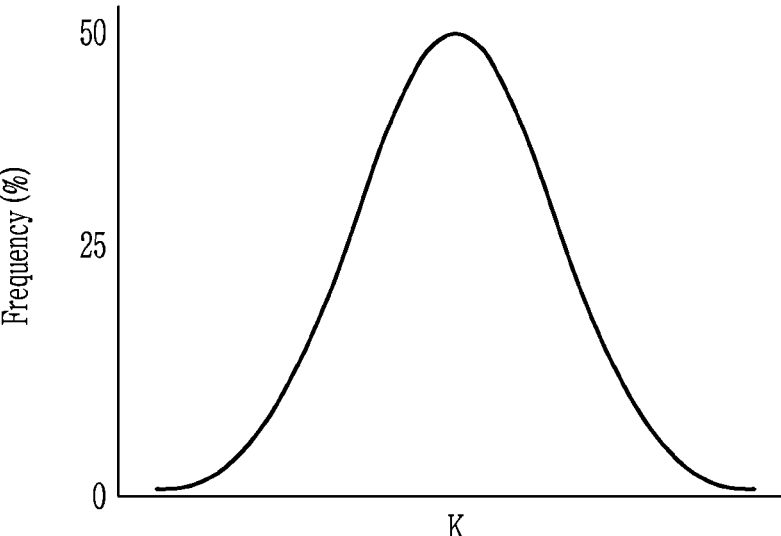
FIG. 8 is a diagram illustrating a phase value distribution of a phase image according to an embodiment of the present disclosure.

FIG. 8 is an exemplary diagram illustrating a phase value distribution of a phase image according to an embodiment of the present disclosure.

A case in which the distribution of phase values of pixels of a block of a phase image (e.g., a first block among a plurality of blocks, for example which may be a sub-block 1 of FIG. 7) is the same as that of FIG. 8 will be described as an example. For example, as in the accompanying FIG. 8, when a large amount of a specific phase value K is distributed among the phase information of the pixels of the block, that is, among the phase values of the pixels, phase information can be expressed by using the difference based on the specific phase value K. In other words, the most distributed phase value K in the block is set as a reference value, and differential data (differential phase information) is obtained by subtracting the reference value K from each of the phase values of all pixels. Then, the differential data is mapped to a range of $-\pi$ to $\pi$ and then encoded.

For example, when phase values are in a range of $-\pi$ to $\pi$ and a phase image has the most pixels of $\pi/2$, the differential data is obtained by performing a process of subtracting $\pi/2$ from the phase value of each pixel for all pixels, thereby the range of the phase value of the differential data has a range of $-3\pi/2$ to $\pi/2$. In this case, $-3\pi/2$ to 0 can be expressed again as $\pi/2$ to 2 $\pi$ through a process of adding $2\pi$. Through this, $\pi/2$ can be expressed as 0, so that the range of values does not increase while expressing the phase value with the most pixels as 0. In this way, it is possible to adjust the histogram distribution of phase values to a desired position in consideration of the periodicity of the phases. Through this, the correlation between an original image and a reference image may be improved during image compression, or the compression rate may be improved by changing the statistical characteristics of a residual signal. Here, the reference value K (e.g., $\pi/2$) may be implicitly derived or may have to be explicitly transmitted.

The method of obtaining differential phase information using such a reference value may be applied to the case of performing independent encoding on the first block in the first example of the above first embodiment. That is, differential phase information may be obtained using a reference value for the first block, and encoding may be performed using the obtained differential phase information. Of course, the differential phase information may be obtained for the remaining blocks except for the first block in the same manner as in the first example, or the differential phase information for the remaining blocks may be obtained by using a reference value in the same manner as in the first block.

The method of obtaining the differential phase information described in the first example of the first embodiment of the present disclosure may be equally applied to a phase image of a moving image as well as a phase image of a still image.

Figure 9:
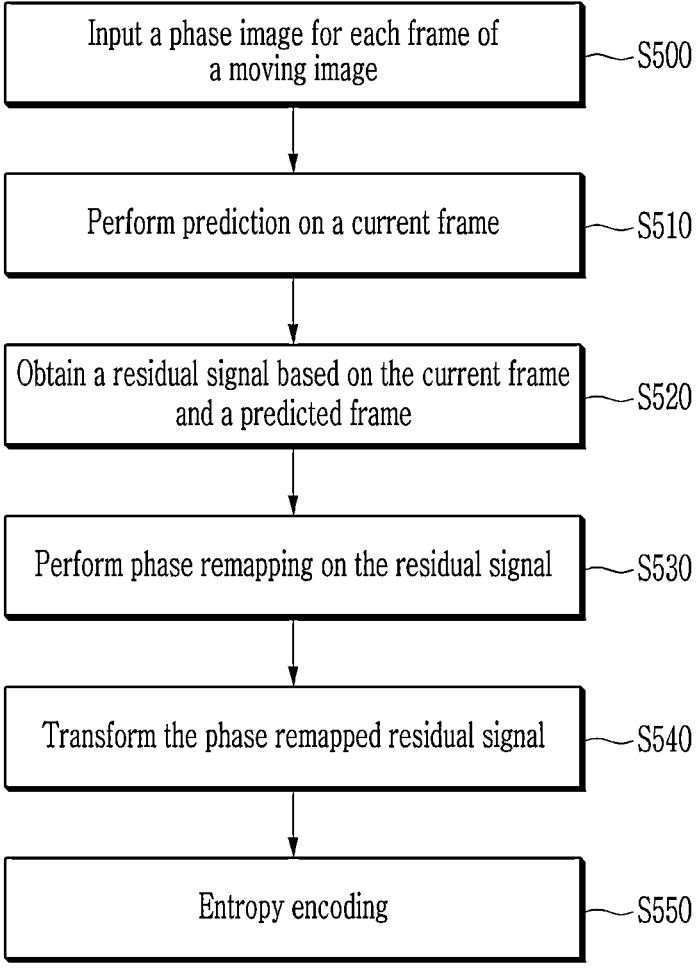
FIG. 9 is a flowchart of a phase information processing method according to a second example of the first embodiment of the present disclosure.

FIG. 9 is a flowchart of a phase information processing method according to a second example of the first embodiment of the present disclosure.

In the second example of the first embodiment of the present disclosure, a phase image of a moving image is expressed in a differential manner.

In moving image encoding, only data and residual signals used for prediction through intra-frame or inter-frame picture prediction are encoded. In this case, the residual component between the frame to be currently encoded and the prediction frame is the differential phase information. If a process of remapping the differential phase information to the range of $-\pi$ to $\pi$ range is additionally performed, the sign information (+ or −) for the differential phase information can be removed or the range of values can be reduced by half. Accordingly, the spatial correlation with respect to the residual signal, which is the differential phase information, is improved, thereby improving the encoding efficiency.

Specifically, as shown in FIG. 9, when a phase image is input for each frame (S500), a prediction frame is generated by performing prediction on a current frame (S510). Here, various prediction techniques used in image and video encoding, such as intra prediction and inter prediction, may be used.

Next, a residual signal (differential phase information) that is a difference between the current frame and the prediction frame is obtained (S520). Phase remapping of mapping the residual signal to a predetermined range based on the periodicity characteristic of the phase is performed (S530). In the phase remapping, for example, a phase in the range of $-2\pi$ to $2\pi$ is again expressed as a predetermined range of $-\pi$ to $\pi$. That is, in the phase values of the residual signal, $2\pi$ is added to phase values smaller than $-\pi$ and $2\pi$ is subtracted from phase values larger than $\pi$, thereby the residual signal is expressed in the range of $-\pi$ to $\pi$.

In this way, the phase-remapped residual signal is transformed into the frequency domain (S540), and the residual signal transformed into the frequency domain is quantized and encoded (S550). In this case, the transform to the frequency domain may be omitted.

FIG. 10 is a flowchart of a phase information processing method according to a third example of the first embodiment of the present disclosure.

The third example of the first embodiment of the present disclosure is based on the second example above, and unlike the second example, differential phase information is obtained for each frame before applying the prediction, and prediction is performed based on it.

Specifically, as shown in FIG. 10, when a phase image is input for each frame (S700), first, the phase image of each frame is mapped to differential phase information (S710). In this case, the method of obtaining the differential phase information used in the first example of the above first embodiment may be used. That is, phase information can be mapped to differential phase information using only information of each frame. For example, a frame is divided into a plurality of blocks, and differential phase information is obtained by expressing a difference between a block encoded with respect to a current block and a block to be encoded next. Alternatively, a reference phase value (the phase value most distributed within a frame or in an arbitrary block of a frame) is set, and differential phase information for each pixel is obtained using the difference between the phase value of the pixel and the reference phase value.

In this way, a prediction frame is obtained by performing prediction on a frame using differential phase information obtained for each frame. That is, a prediction frame is generated by performing prediction on the current frame mapped with the differential phase information (S720).

Next, a residual signal (differential phase information) that is a difference between the current frame and the prediction frame is obtained (S730). Phase remapping is performed on the residual signal to map the residual signal to a predetermined range based on the periodicity characteristic of the phase (S740).

The phase remapping-processed residual signal is transformed into a frequency domain (S750), and the residual signal transformed into the frequency domain is quantized and encoded (S760). Even in this case, the transform may be omitted in some cases.

In the second and third examples of the first embodiment described above, it has been described that differential phase information is obtained based on the original signal and the obtained signal by performing prediction on the original signal which is the input phase image, but the present disclosure is not limited thereto. The present disclosure may be applied to the case of obtaining differential phase information based on the original signal and the obtained signal by performing other signal processing (e.g., filtering, etc.) on the original signal except for prediction.

On the other hand, in the examples of the first embodiment described above, phase remapping is performed on differential phase information so that the value of the differential phase information is within a range having a period of $2\pi$, but phase remapping may be performed on the phase information of the phase image (to be called an original signal), or an original signal or a reference signal used to obtain differential phase information so that differential phase information obtained based on the remapped original signal or the remapped reference signal may be included in the predetermined range.

Here, the reference signal includes all types of data, information, and signals used to obtain differential phase information. For example, the reference signal in the first example of the first embodiment may be decoded data of an already encoded block, the reference signal in the second example of the first embodiment may be the reference value K, and the reference signal in the third example of the first embodiment may be a prediction signal (prediction frame) obtained by performing prediction on the original signal. Of course, when differential phase information is obtained using a signal obtained through signal processing other than prediction, the signal obtained through other signal processing is used as a reference signal.

Figure 11:
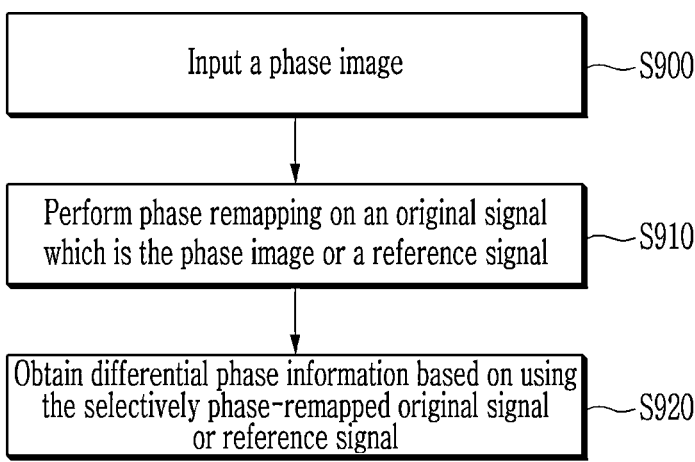
FIG. 11 is a flowchart of a phase information processing method according to a second embodiment of the present disclosure.

FIG. 11 is a flowchart of a phase information processing method according to a second embodiment of the present disclosure.

In a phase information processing method according to a second embodiment of the present disclosure, phase remapping is performed on an input original signal, which is an input phase image, or a reference signal used to obtain differential phase information, so that the differential phase information obtained later may be included in the predetermined range.

Specifically, as shown in FIG. 11, the phase information is expressed as an image, and the phase image is input (S900).

To this end, phase remapping is performed on an input original signal, which is the input phase image, or a reference signal used to obtain differential phase information (S910). Specifically, the original signal or the reference signal is mapped to a new predetermined range based on the periodicity characteristic of the phase. Here, the predetermined range has a range of a first phase value to a second phase value having a periodic characteristic of $2\pi$. For example, by performing a process of adding a $2\pi$ value to phase values smaller than the first phase value in the phase information of the original signal or reference signal and subtracting a $2\pi$ value from phase values larger than the second phase value in the phase information of the original signal or reference signal, the phase information is mapped to a new predetermined range. Through this, the correlation information of the phase information can be improved. Thereafter, differential phase information is obtained using the selectively phase-remapped original signal or reference signal (S920). That is, differential phase information is obtained using the phase-remapped original signal and the reference signal, or differential phase information is obtained using the original signal and the phase-remapped reference signal.

Accordingly, a differential phase image may be obtained based on differential phase information included in the predetermined range.

Meanwhile, in the second embodiment of the present disclosure, when phase remapping is performed on the reference signal, the phase remapping may be performed to adjust the range of the phase-remapped reference signal according to the range of the original signal. If the range of the original signal is, for example, $-1.5\pi\sim0$, the range of the phase-remapped reference signal must be in the range of $0\sim0.5\pi$, so that the minimum value of differential phase information obtained based on the original signal and the phase-remapped reference signal becomes $-2\pi$ and the maximum value of the differential phase information becomes 0, thereby the differential phase information has a range of $2\pi$ phases. In other words, in order for the differential phase information to have a range of $2\pi$ phases, which is a predetermined range, a value $(-1.5\pi-0.5\pi=-2\pi)$ obtained by subtracting the maximum phase value of the phase-remapped reference signal from the minimum phase value of the original signal and a value $(0-0=0)$ obtained by subtracting the minimum phase value of the phase-remapped reference signal from the maximum phase value of the original signal is in a range of $2\pi$ phases $(-2\pi$ to $0)$. To this end, if the range of the reference signal before phase-remapped is 0 to $2\pi$, phase remapping is performed on the reference signal by dividing the range by 4, so that the range of the phase-remapped reference signal is 0 to $0.5\pi$. As described above, phase remapping may be performed on the reference signal so that the range of the phase-remapped reference signal is adjusted according to the range of the original signal, thereby the resulting differential phase information has a range of $2\pi$ phases.

If the range of the phase value of the original signal is A to B, the range (the absolute difference between the maximum phase value and the minimum phase value) of the phase value that the reference signal can have is $(2\pi-|A-B|)$. Here, | | means an absolute value. In other words, the condition that the sum of the phase range of the original signal and the phase range of the reference signal becomes $2\pi$ should be satisfied. Then, in order to fit the reference signal to the desired phase range value, the overall phase values are divided by N values, where N is equal to a value of (a phase range of reference signal)/(a phase range of remapped reference signal) or a value of $2\pi$/(a phase range of the remapped reference signal). In the example above, if the original signal is $-1.5\pi$ to 0, the value of |A–B| becomes $1.5\pi$, so that the range of phases that the reference signal can have is $0.5\pi$. It may be $-0.25\pi$-$0.25\pi$, it may be $-0.5\pi$-0, or it may be 0-$0.5\pi$. That is, the phase range of the reference signal only needs to satisfy $0.5\pi$. In general, since the range of the phase value of the reference signal is $2\pi$, in this case, the value of N becomes 4. However, if the range of the phase value of the reference signal is $\pi$, the value of N becomes 2.

To this end, when phase remapping is performed on the original signal based on the above example, the phase remapping may be performed to adjust the range of the phase-remapped original signal according to the range of the reference signal so that the differential phase information obtained based on the reference signal and the phase-remapped original signal may have a range of $2\pi$ phases.

In this second embodiment of the present disclosure, the methods described in the examples of the first embodiment above may be applied in obtaining the differential phase information.

Figure 12:
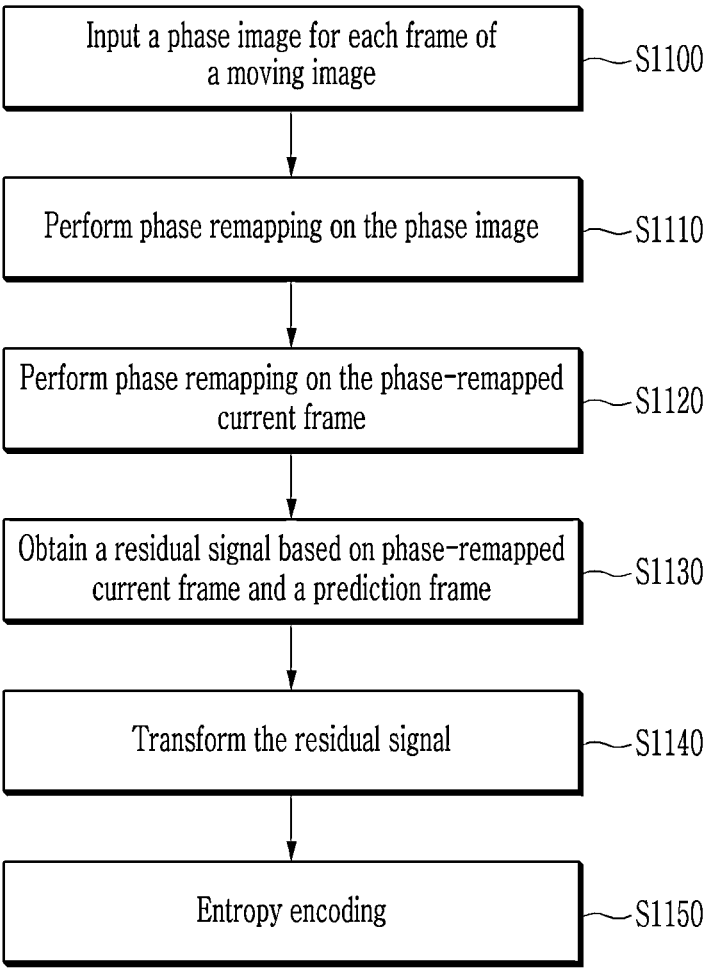
FIG. 12 is a flowchart of a phase information processing method according to a first example of a second embodiment of the present disclosure.

FIG. 12 is a flowchart of a phase information processing method according to a first example of a second embodiment of the present disclosure.

The first example of the second embodiment is similar to the second example of the first embodiment above, except that phase remapping is performed on an original signal other than differential phase information.

As shown in FIG. 12, when a phase image is input for each frame (S1000), phase remapping is performed on the phase information of the phase image for the current frame into a predetermined range based on the periodicity characteristic of the phase (S1100).

Then, a prediction frame is generated by performing prediction on the phase-remapped current frame (S1120). Here, various prediction techniques used in image and video encoding, such as intra prediction and inter prediction, may be used. In this case, the order in which prediction and phase remapping are performed may be changed. That is, even if prediction is performed and phase remapping is performed again only on the predicted region, similar results are obtained.

Next, a residual signal (differential phase information) that is a difference between the phase-remapped current frame and the prediction frame is obtained (S1130). In this way, phase remapping is performed before the residual signal is obtained, and the residual signal is obtained based on the signal on which the phase remapping has been performed, thereby the residual signal is expressed as a predetermined range (e.g., a range of $-\pi$ to $\pi$).

The residual signal is transformed into a frequency domain (S1140), and the residual signal transformed into the frequency domain is quantized and encoded (S1150).

In this case, the frequency domain conversion may be omitted. The first example of the second embodiment may be equally applied to a case where signal processing other than prediction is performed.

In addition, based on the first example of the second embodiment, phase remapping is performed on a reference signal (prediction frame, etc.) other than an original signal, so that differential phase information which is a residual signal obtained based on the original signal and the phase-remapped reference signal is included in the predetermined range.

Figure 13:
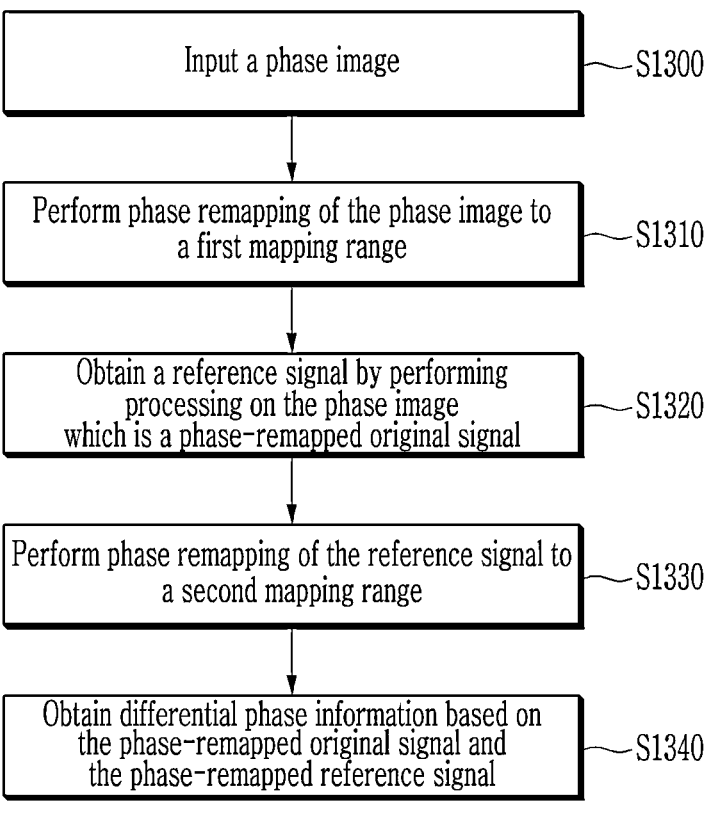
FIG. 13 is a flowchart of a phase information processing method according to a third embodiment of the present disclosure.

FIG. 13 is a flowchart of a phase information processing method according to a third embodiment of the present disclosure.

A phase information processing method according to a third embodiment of the present disclosure performs phase remapping on an input original signal, which is an input phase image, and a reference signal used to obtain differential phase information, respectively, so that later-obtained differential phase information is within a predetermined range. Here, the range of the difference between the phase-remapped original signal and the phase-remapped reference signal is $2\pi$. To this end, phase remapping to a first mapping range is performed on the original signal and phase remapping to a second mapping range is performed on the reference signal, so that differential phase information obtained based on the phase-remapped original signal and the phase-remapped reference signal is included in the predetermined range.

Specifically, as shown in FIG. 13, when a phase image is input (S1300), an operation of adjusting a range of the phase information of the input phase image is performed. That is, phase remapping is performed, which maps the phase information of the phase image to the first mapping range (S1310). Here, the first mapping range is a range for allowing differential phase information obtained later to be included in the predetermined range, and may be, for example, a range having a characteristic of a smaller period than $2\pi$, where the first mapping range may be $-\pi/2$ to $\pi/2$.

Thereafter, differential phase information is obtained based on the phase information on which the phase remapping of the input phase image is performed. To obtain differential phase information, signal processing is performed on the phase image. For example, the signal processing may include prediction, filtering, and the like. A reference signal (such as a prediction signal or a filtered signal) is obtained by performing signal processing on the phase image, that is, the original signal (S1320).

Phase remapping of the reference signal to the second mapping range is performed (S1330). Here, the second mapping range is a range for allowing differential phase information obtained later to be included in the predetermined range, and for example, may be a range having a characteristic of a smaller period than $2\pi$, where the second mapping range may be $-\pi/2$ to $\pi/2$. Here, although the first mapping range and the second mapping range are the same, they may be different.

Next, differential phase information (also called a residual signal) is obtained based on the phase-remapped original signal and the phase-remapped reference signal (S1340). Since the obtained differential phase information is, for example, a residual signal based on an original signal having phase information of $-\pi/2$ to $\pi/2$ and a reference signal having phase information of $-\pi/2$ to $\pi/2$, the differential phase information fall within the range of $-\pi$ to $\pi$.

A differential phase image may be obtained based on the differential phase information.

In this third embodiment of the present disclosure, the methods described in the examples of the first embodiment above may be applied in obtaining the differential phase information.

According to the embodiments of the present disclosure described above, phase remapping may be applied to the residual signal, or the range of the signal may be adjusted in a signal processing process such as prediction (phase remapping is performed on at least one of an original signal and a reference signal), so that the residual signal (differential phase information) may be included in a predetermined range (e.g., $-\pi$ to $\pi$). In addition, by changing the prediction technique in consideration of the periodicity of the phase, the range of the residual signal may be expressed as a predetermined range having a periodic characteristic of $2\pi$.

The method according to the embodiments of the present disclosure can be applied to any method of expressing a residual signal (differential phase information) generated in image or moving image compression and signal processing through phase periodicity. In addition, the method of obtaining differential phase information (residual signal) in the embodiment of the present disclosure is not limited to those described above.

According to these embodiments, although the phase information has the same amount of information, it is possible to differentiate and express the phase information using the periodicity of the phase information. In particular, for phase information of a still image, phase information can be remapped into differential phase information using only intra-screen information. For phase information of a moving image, in addition to phase remapping for phase information of a still image, phase remapping can also be applied to the residual signal after inter prediction.

In addition, the method according to an embodiment of the present disclosure may be applied to an image processing process for various phase information expressed in an image form as well as compression.

Figure 14:
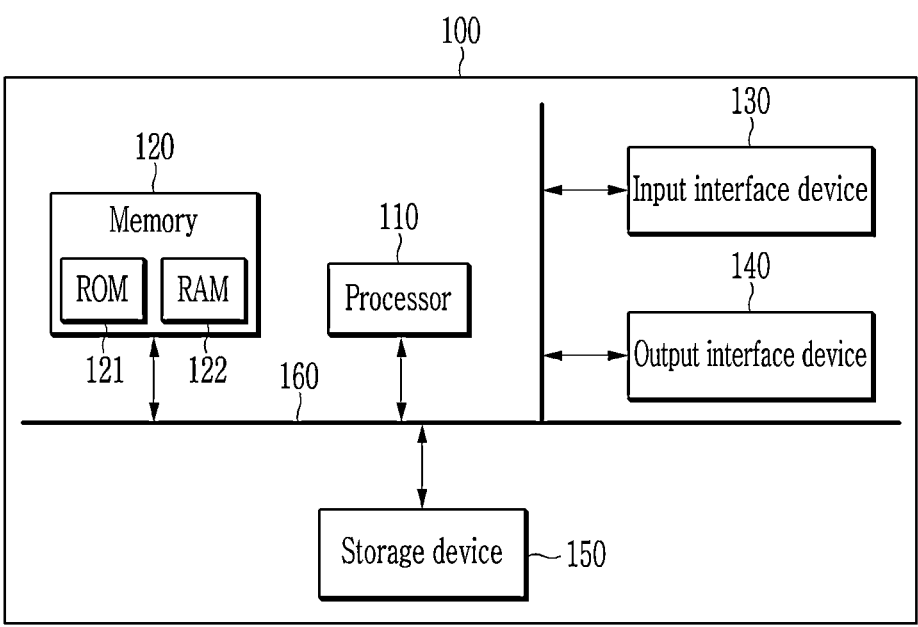
FIG. 14 is a structural diagram illustrating a computing device for implementing a method for processing phase information according to an embodiment of the present disclosure.

FIG. 14 is a structural diagram illustrating a computing device for implementing a method for processing phase information according to an embodiment of the present disclosure.

As shown in FIG. 14, the phase information processing method according to an embodiment of the present disclosure may be implemented using the computing device 100. The computing device 100 may include at least one of a processor 110, a memory 120, an input interface device 130, an output interface device 140, and a storage device 150. Each of the components may be connected by a bus 160 to communicate with each other. In addition, each of the components may be connected through an individual interface or a separate bus centering on the processor 110 instead of the common bus 160.

The processor 110 may be implemented as various types such as an application processor (AP), a central processing unit (CPU), a graphics processing unit (GPU), and the like, and may be any semiconductor device that executes an instruction stored in the memory 120 or the storage device 150. The processor 110 may execute a program command stored in at least one of the memory 120 and the storage device 150. The processor 110 may be configured to implement the functions and methods described based on FIGS. 1 to 13 above.

The memory 120 and the storage device 150 may include various types of volatile or non-volatile storage media. For example, the memory may include a read-only memory (ROM) 121 and a random access memory (RAM) 122. In an embodiment of the present disclosure, the memory 120 may be located inside or outside the processor 110, and the memory 120 may be connected to the processor 110 through various known means.

The input interface device 130 is configured to provide data (e.g., a phase image, etc.) to the processor 110, and the output interface device 140 is configured to output data from the processor 110.

The computing device 100 having such a structure is called a phase information processing device, and may implement the phase information processing method according to an embodiment of the present disclosure.

In addition, at least a part of the phase information processing method according to an embodiment of the present disclosure may be implemented as a program or software executed in the computing device 100, and the program or software may be stored in a computer-readable medium.

In addition, at least a part of the phase information processing method according to an embodiment of the present disclosure may be implemented as hardware capable of being electrically connected to the computing device 100.

According to embodiments, in expressing the phase information as an image, the image may be expressed as the differential phase information based on the fact that the phase has a periodic characteristic based on $2\pi$. Particularly, a residual signal generated in image or moving image compression and signal processing can be expressed within the range of a $2\pi$ phase period through the periodicity of the phase.

Accordingly, it is possible to improve compression efficiency by improving spatiotemporal correlation in the image. Embodiments of the present disclosure are not implemented only through the above-described apparatus and/or method, but may be implemented through a program for implementing a function corresponding to the configuration of an embodiment of the present disclosure and a recording medium in which the program is recorded.

The embodiments of the present disclosure are not implemented only through the apparatus and/or method described above, but may be implemented through a program for realizing a function corresponding to the configuration of the embodiment of the present disclosure, and a recording medium in which the program is recorded. This implementation can also be easily performed by expert person skilled in the technical field to which the present disclosure belongs from the description of the above-described embodiments.

The components described in the embodiment s may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the embodiment s may be implemented by software, and the software may be recorded on a recording medium. The components, functions, and processes described in the embodiment s may be implemented by a combination of hardware and software.

The method according to embodiment s may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages, and may be deployed in any form including a stand-alone program or a module, a component, a subroutine, or other units appropriate for use in a computing environment. A computer program may be deployed to be executed on one computer or on multiple computers at one site or distributed across multiple sites and interconnected by a communication network. Processors appropriate for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic disks, magneto-optical disks, or optical disks. Examples of information carriers appropriate for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk, and a read only memory (ROM), a random access memory (RAM), a flash memory, an erasable programmable ROM (EPROM), and an electrically erasable programmable ROM (EEPROM), and any other known computer readable medium. A processor and a memory may be supplemented by, or integrated with, a special purpose logic circuit. The processor may run an operating system (OS) and one or more software applications that run on the OS. The processor device also may access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific embodiment. Features described in the specification in the context of individual embodiment s may be implemented as a combination in a single embodiment. In contrast, various features described in the specification in the context of a single embodiment may be implemented in multiple embodiment s individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood that the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described embodiment s in all embodiment s, and it should be understood that the above-described program components and apparatuses may be incorporated into a single software product or may be packaged in multiple software products. It should be understood that the embodiments disclosed herein are merely illustrative and are not intended to limit the scope of the disclosure. It will be apparent to one of ordinary skill in the art that various modifications of the embodiment s may be made without departing from the spirit and scope of the claims and their equivalents.

What is claimed is:

1. A method comprising:

receiving, by a processing device, a phase image including phase information;

obtaining, by the processing device, differential phase information based on the phase image and a reference signal;

performing, by the processing device, phase remapping of mapping the differential phase information to a predetermined range; and encoding, by the processing device, the phase image based on the phase remapping, wherein the predetermined range is a range of a first phase value to a second phase value having a period of $2\pi$, and a difference between the first phase value and the second phase value is $2\pi$, wherein, when the phase image is a phase image of a moving image, the phase image is input frame by frame, and the obtaining of differential phase information comprises:

obtaining a prediction frame which is the reference signal by performing prediction on a phase image of a current frame; and obtaining a residual signal between an original signal that is a phase image of the current frame and a reference signal that is the prediction frame and using the residual signal as the differential phase information.

2. The method of claim 1, wherein the phase image is expressed as differential information.

3. The method of claim 1, wherein the obtaining of differential phase information comprises:

performing phase remapping of mapping of an original signal which is the phase image or the reference signal to the predetermined range.

4. The method of claim 1, wherein the performing of phase remapping of mapping the differential phase information to the predetermined range comprises:

adding a value of $2\pi$ to a smaller value than the first phase value among values of the phase information; and subtracting a value of $2\pi$ from a greater value than the second phase value among values of the phase information, wherein the phase information is related to one of the phase image, the reference signal, and the differential phase information.

5. The method of claim 1, wherein the performing phase remapping of mapping the differential phase comprises:

adding a value of $2\pi$ to a smaller value than the first phase value among values of the differential phase information; and subtracting a value of $2\pi$ from a greater value than the second phase value among values of the differential phase information.

6. The method of claim 1, wherein the obtaining of a prediction frame that is the reference signal comprises:

performing phase remapping of adjusting phase information to a first mapping range on a phase image of a current frame; and obtaining the prediction frame as the reference signal by performing prediction on the phase image of the current frame adjusted to the first mapping range, and the using of the residual signal as the differential phase information comprises:

performing phase remapping of adjusting phase information to a second mapping range on the prediction frame, which is the reference signal; and obtaining a residual signal between the current frame adjusted to the first mapping range and the prediction frame adjusted to the second mapping range, and using the residual signal as the differential phase information.

7. An apparatus comprising:

an interface device; and a processor configured to perform processing of phase information input through the interface device, wherein the processor is configured to control the apparatus to:

receive a phase image including phase information through the interface device;

obtain differential phase information based on the phase image and a reference signal;

perform phase remapping of mapping the differential phase information to a predetermined range; and encode the phase image based on the phase remapping, wherein the predetermined range is a range of a first phase value to a second phase value having a period of $2\pi$, and a difference between the first phase value and the second phase value is $2\pi$, wherein when the phase image is a phase image of a moving image, the phase image is input frame by frame, and the processor is configured to control the apparatus to, when obtaining the differential phase information:

obtain a prediction frame which is the reference signal by performing prediction on a phase image of a current frame; and obtain a residual signal between an original signal that is a phase image of the current frame and a reference signal that is the prediction frame and using the residual signal as the differential phase information.

8. The apparatus of claim 7, wherein the processor is configured to control the apparatus to:

perform phase remapping of mapping an original signal which is the phase image or the reference signal to the predetermined range when obtaining differential phase information.

9. The apparatus of claim 7, wherein the processor is configured to control the apparatus to, when performing phase remapping:

add a value of $2\pi$ to a smaller value than the first phase value among values of the phase information; and subtract a value of $2\pi$ from a greater value than the second phase value among values of the phase information, wherein the phase information is related to one of the phase image, the reference signal, and the differential phase information.

10. The apparatus of claim 7, wherein the processor is configured to further control the apparatus to, after obtaining the differential phase information, perform phase remapping of mapping the differential phase information to the predetermined range, and the processor is configured to control the apparatus to, when performing phase remapping of mapping the differential phase information:

add a value of $2\pi$ to a smaller value than the first phase value among values of the differential phase information; and subtract a value of $2\pi$ from a greater value than the second phase value among values of the differential phase information.

11. The apparatus of claim 7, wherein the processor is configured to control the apparatus to, when obtaining a prediction frame that is the reference signal:

perform phase remapping of adjusting phase information to a first mapping range on a phase image of a current frame; and obtain the prediction frame as the reference signal by performing prediction on the phase image of the current frame adjusted to the first mapping range, and the processor is configured to control the apparatus, when using of the residual signal as the differential phase information, perform phase remapping of adjusting phase information to a second mapping range on the prediction frame, which is the reference signal, and obtain a residual signal between the current frame adjusted to the first mapping range and the prediction frame adjusted to the second mapping range, and using the residual signal as the differential phase information.

* * * * *